Patented Feb. 7, 1928.

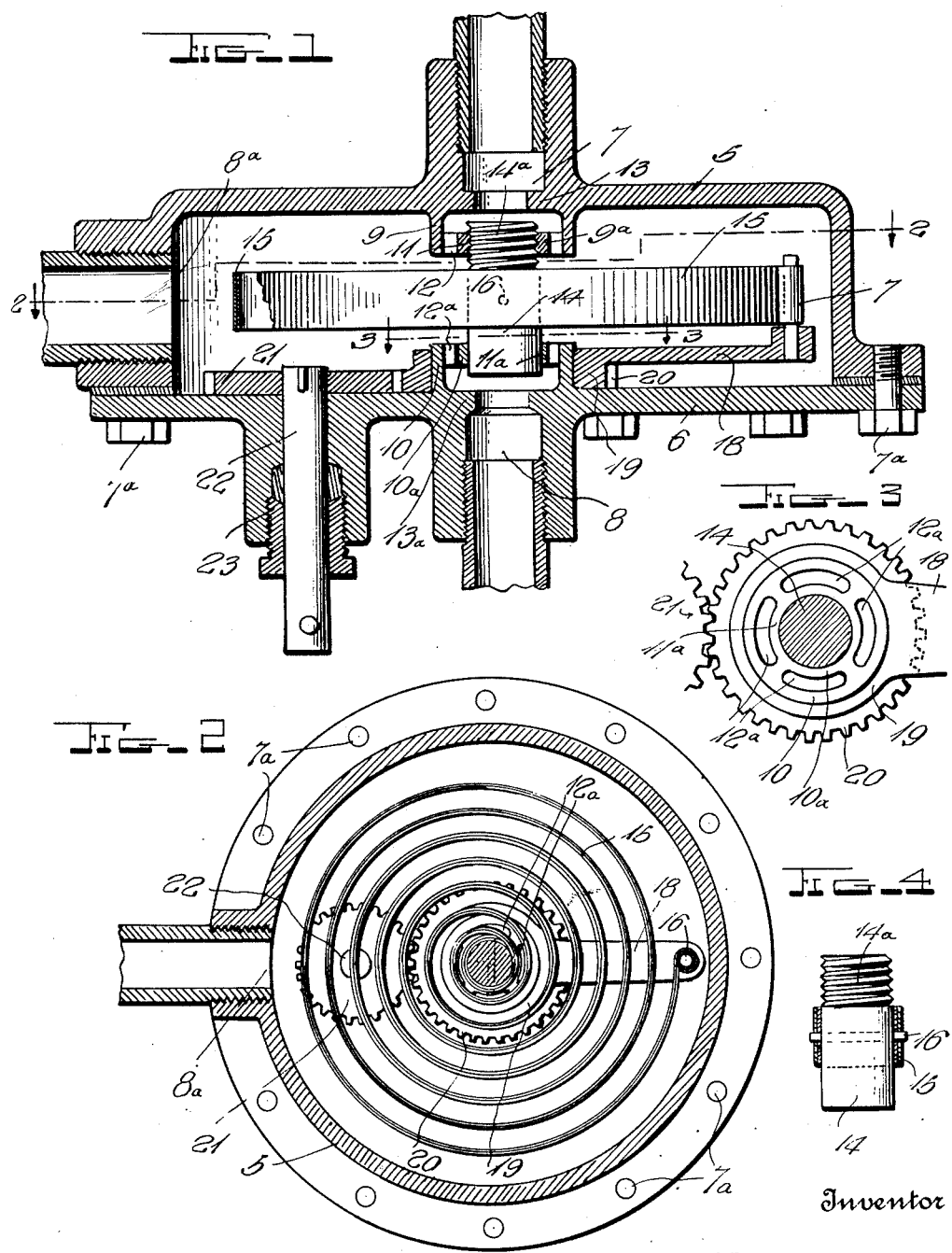

1,658,726

UNITED STATES PATENT OFFICE.

CHARLES H. LEMERY, OF SACRAMENTO, CALIFORNIA.

THERMOSTATIC MIXING VALVE.

Application filed December 23, 1926. Serial No. 156,720.

The invention while relating to valves in general, lies also within the field of thermostatic valves, and the specific embodiment herein disclosed, is directed to a thermostatic mixing valve for receiving hot and cold water in varying quantities according to their temperatures, and mixing them to attain water of predetermined temperature.

One object of the invention is to provide a novel casing-contained valve rotatably mounted and provided with means brought into play by its rotation for moving it toward or from its seat.

A further aim is to provide a rotatable double-ended valve mounted between two opposed seats and provided with means whereby its rotation in one direction will move it toward one seat and away from the other, reverse movement of the valve being effected by reverse rotation of said valve.

A still further object is to associate a thermostat with the valve in a novel manner to effect its rotation.

Yet another aim is to provide means whereby the thermostat and valve may be manually rotated to change the position of said valve as occasion may demand.

The means just referred to, includes a movable member in the casing, forming an anchor for one end of the thermostat, and it is an additional object to mount said member in a unique and advantageous manner.

Still another object is to provide novel construction for mounting the ends of the double-ended valve in proper relation with the co-acting seats.

With the foregoing and minor objects in view, the invention resides in the novel subject matter hereinafter described and claimed, the description being supplemented by the accompanying drawings.

Fig. 1 is a sectional view through a thermostatic mixing valve constructed in accordance with my invention.

Figs. 2 and 3 are transverse sectional views as indicated by lines 2—2 and 3—3 of Fig. 1.

Fig. 4 is a side elevation of the double-ended valve, illustrating a portion of the thermostat in section.

In describing my invention, I will confine the descriptive matter to a thermostatic mixing valve, with the understanding however, that certain parts and groups of parts are not restricted to valves of this particular type.

The numeral 5 designates a substantially circular casing which may occupy any desired position, said casing being preferably provided with a removable side plate 6 held normally in place by cap screws 7ª. The opposed sides of this casing are formed with inlets 7 and 8 for liquid of different temperatures, and the peripheral wall of the casing is provided with an outlet 8ᶜ for liquid which has attained a predetermined temperature by proper proportioning of the hot and cold liquid entering through the inlets 7 and 8.

The opposed sides of the casing 5 are provided with internal, hollow bosses 9 and 10, into which the inlets 7 and 8 respectively, open, said bosses having inner end walls 9ª and 10ª respectively, formed with central valve-receiving openings 11 and 11ª, the opening 11 being threaded whereas the opening 11ª is smooth-walled. In the present disclosure, the walls 9ª and 10ª are formed with water inlet openings 12 and 12ª respectively.

At the outer ends of the bosses 9 and 10, the casing 5 is provided with valve seats 13 and 13ª which face toward and are in axial alinement with the openings 11 and 11ª. A cylindrical, double-ended valve 14 is rotatably received in the openings 11 and 11ª and is provided with a threaded end 14ª which end is in threaded engagement with the wall of the opening 11. The ends of the valve 14 are preferably flat and these ends are co-operable with the seats 13 and 13ª to control the amount of hot and cold liquid entering the casing through the inlets 7 and 8. It will be observed that it is necessary to rotate the valve 14 in order to move it toward one seat and away from the other or vice versa, and for so rotating the valve, I make provision now to be described.

A spiral thermostat 15, preferably formed from two metals having different co-efficients of expansion, is disposed in the casing 5, around the valve 14, and the inner end of this thermostat is connected to this valve by a pin or other desired means 16. The outer end of the thermostat however, is anchored. Thus, if the temperature of the liquid in the casing 5 either rises or falls above a predetermined degree of heat, the thermostat 15 will expand or contract as the case may be, thus rotating the valve 14 in one direction or the other, causing the screw threads 14ª and those at the wall of the opening 11, to effect longitudinal shifting of said valve, so as to admit more liquid of one temperature and less liquid of the other temperature or vice versa, as occasion may demand. Thus, it is insured that the liquid discharged through the outlet 8ª shall possess substantially a predetermined temperature.

The outer end of the thermostat 15 is anchored at 17 to a movable member 18 which is disposed between said thermostat and one side of the casing 5, said member 18 having an annular portion 19 which rotatably surrounds one of the bosses 9—10, thereby rotatably mounting the member 18. It will be noticed that if this member be rotated, it moves concentrically with the valve 14 and at the same time causes rotation of the thermostat 15 and said valve 14, effecting adjustment of this valve with respect to its seats. Thus, by adjusting the member 18 in one direction or the other, the valve may be so adjusted as to control the temperature of the liquid discharged through the outlet 8ª, this result being attainable because of the fact that if the valve 14 is adjusted rather close to one of its seats, for instance, the cold liquid seat, less movement of the thermostat will be necessary to effect shutting off of the cold liquid inlet, thereby insuring that a hotter liquid shall be discharged through the outlet 9 than if the valve 14 were adjusted toward its other extreme position. Adjustment in this last named manner, would insure quicker cutting off of the hot liquid inlet and would consequently insure a lower temperature of liquid discharged through the outlet 8ª.

For rotating the member 18, I prefer to provide its annular portion 19 with gear teeth 20 meshing with the teeth of a gear 21. This gear is fixed to a shaft 22 which extends to the exterior of the casing 5, through an appropriate stuffing box 23. The shaft 22 may be manually turned to attain liquid of the desired temperature, and the friction existing between the parts 22—23—19—10 or 9, will hold the member 18 in the position to which it has been adjusted.

The principal use of the invention is for the purpose of mixing hot and cold water to obtain water of predetermined temperature, but the invention is not restricted to this particular field of use, and moreover, certain features of the invention are not necessarily restricted to thermostatic valves.

I claim:

1. In a valve, a casing having passages and opposed seats therefor, a double-ended valve between said seats for co-action therewith, said valve being of less length than the distance between said seats, means mounting said valve for rotation about its longitudinal axis, means for shifting said valve in the direction of its axis toward one seat or the other according to the direction in which it is rotated, and a thermostat in the casing connected with said valve for rotating the same.

2. In a valve, a casing having passages and opposed seats therefor, a double-ended valve between said seats for co-action therewith, said valve being of less length than the distance between said seats, means mounting said valve for rotation about its longitudinal axis, means for shifting said valve in the direction of its axis toward one seat or the other according to the direction in which it is rotated, and a spiral thermostat in the casing surrounding the valve and having its inner end connected with the latter, the outer end of said thermostat being anchored.

3. In a valve, a casing having passages and opposed seats therefor, a double-ended valve between said seats for co-action therewith, said valve being of less length than the distance between said seats, means mounting said valve for rotation about its longitudinal axis, means for shifting said valve in the direction of its axis toward one seat or the other according to the direction in which it is rotated, a spiral thermostat in the casing surrounding the valve and having its inner end connected with the latter, a member rotatably mounted in the casing concentrically with the valve and serving as an anchor for the outer end of said thermostat, and means extending to the exterior of the casing and connected operatively with said member for rotating it about its axis, thereby rotating the thermostat and valve also.

4. In a valve, a casing having a hollow internal boss and a passage communicating therewith, a valve rotatably entering said boss for controlling said passage, a thermostat in the casing connected at one end with said valve for rotating it, a movable member in the casing to which the other end of said thermostat is anchored, said member having a portion surrounding said boss, whereby it is rotatably mounted, and means connected operatively with said member and extending to the exterior of the casing for rotating said member, thereby also rotating the thermostat and valve.

5. In a valve, a casing having a passage and a valve seat therefor, a valve rotatably mounted in the casing, means for moving said valve toward or from said seat according to the direction in which it is rotated, a thermostat in the casing connected at one end to said valve for rotating the latter, a member rotatably mounted in the casing concentrically with the valve and serving as an anchor for the other end of the thermostat, and means connected with said member and extending to the exterior of the casing for rotating said member, thereby also rotating the thermostat and valve.

6. In a valve, a casing having a passage and a valve seat therefor, a valve rotatably mounted in the casing, means for moving said valve in the direction of its axis toward or from said seat according to the direction in which it is rotated, and a spiral thermostat in the casing surrounding and connected at its inner end with said valve for rotating the latter, the outer end of said thermostat being anchored.

7. In a valve, a casing having passages and opposed hollow internal bosses into which said passages open, the inner ends of said bosses having valve receiving openings, the casing having valve seats spaced outwardly from and facing said openings, a double-ended valve received rotatably in said openings with its ends in co-operable relation with said seats, said valve being of a length less than the distance between said seats and being threaded into at least one of said openings, and means for rotating said valve.

In testimony whereof I have hereunto affixed my signature.

CHARLES H. LEMERY.